Patented Jan. 13, 1925.

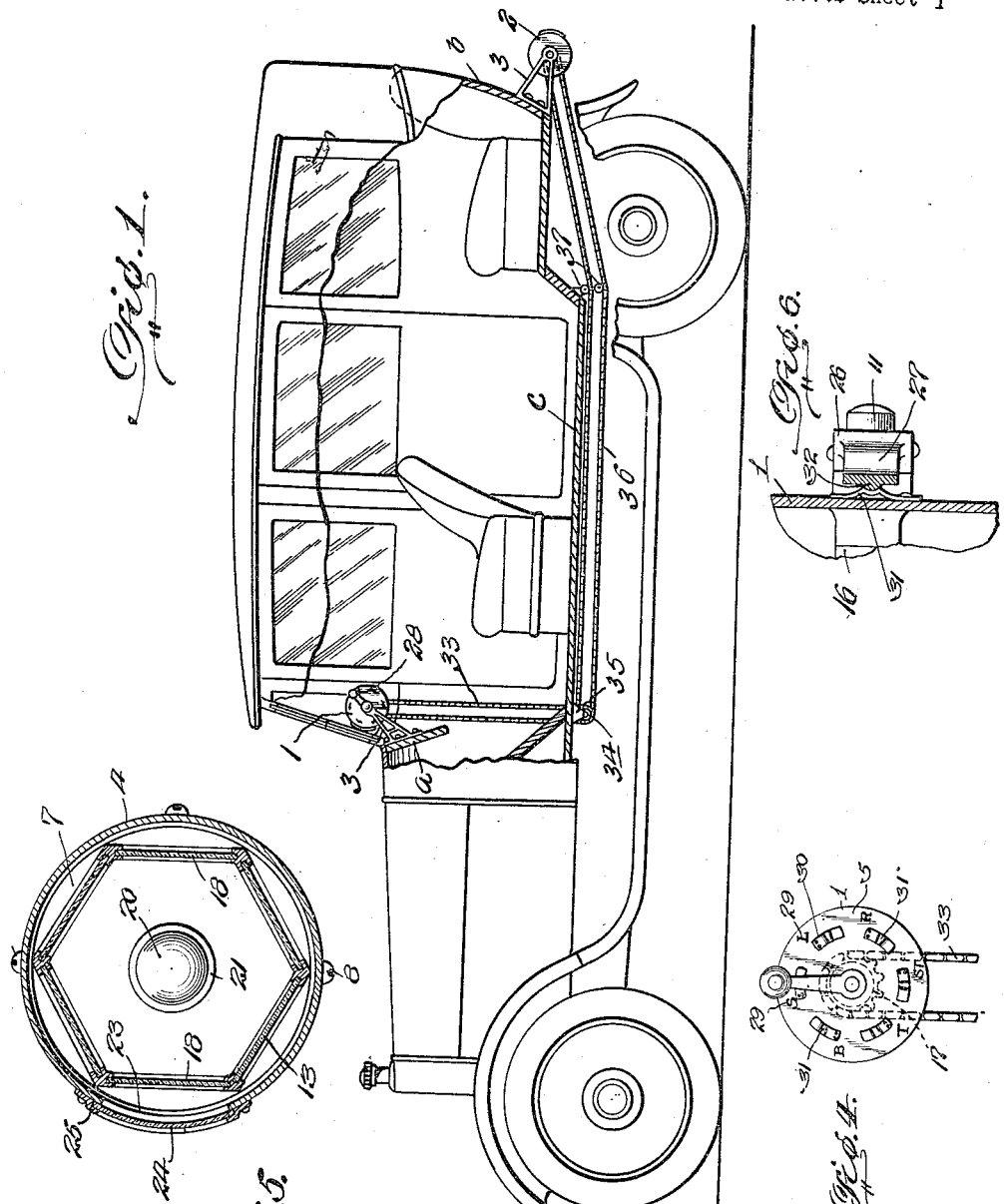

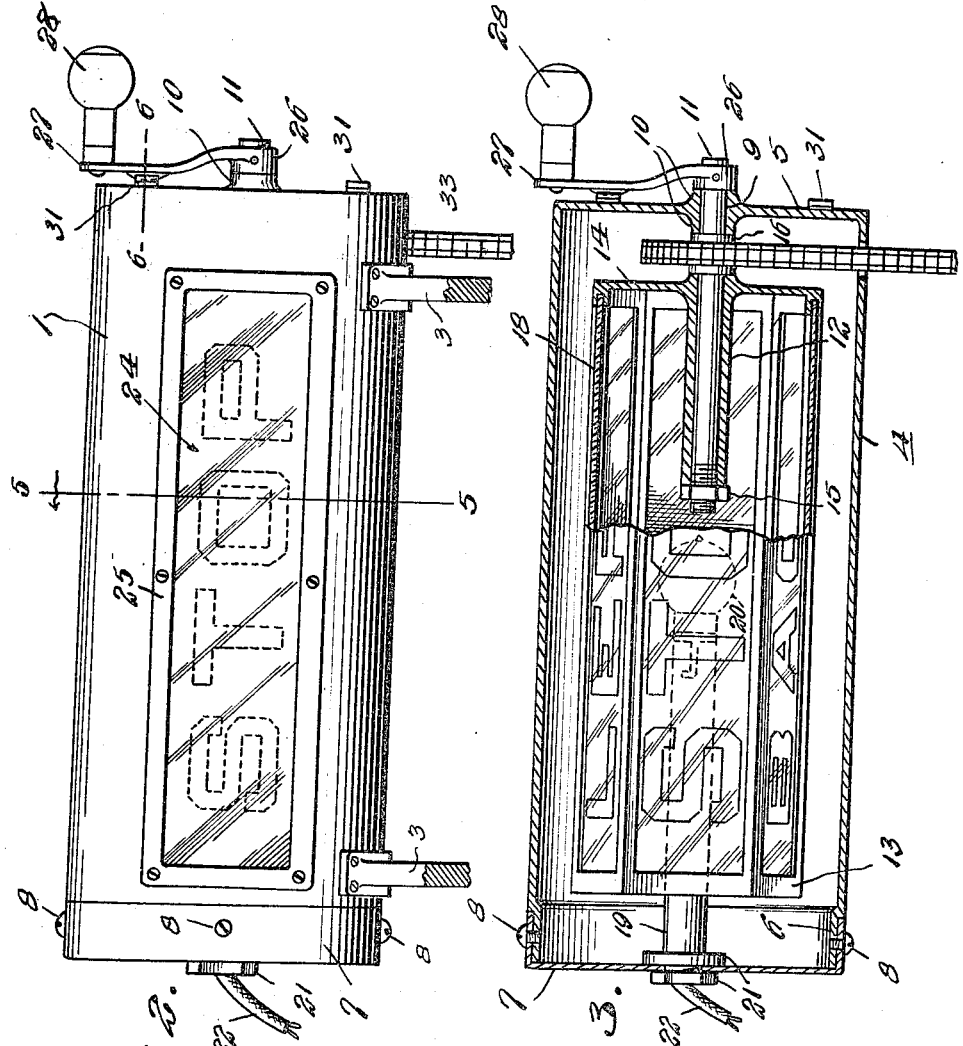

1,522,661

UNITED STATES PATENT OFFICE.

GEORGE W. WILKINS, OF TRINIDAD, COLORADO.

AUTOMOBILE DIRECTION INDICATOR.

Application filed December 2, 1922. Serial No. 604,625.

*To all whom it may concern:*

Be it known that I, GEORGE W. WILKINS, a citizen of the United States, residing at Trinidad, in the county of Las Animas and State of Colorado, have invented certain new and useful Improvements in Automobile Direction Indicators, of which the following is a specification.

My invention relates to new and useful improvements in direction indicators for automobiles and the primary object thereof, resides in the provision of a pair of signal boxes having suitable indicating means arranged therein, these boxes being so disposed upon the vehicle, as to indicate both forwardly and rearwardly thereof, the intention of the driver of the vehicle to make a right or left turn, stop, back up, etc.

A further object of the invention is to provide an improved form of signalling means that is of relatively simple construction, comparatively easy of installation upon a motor vehicle, and one that is highly efficient in its operation and purpose.

With these general objects in view and others, that will appear as the nature of the invention is better understood, the same consists in the novel construction, combination, and arrangement of parts hereinafter more fully described, illustrated in the accompanying drawings, and pointed out in the appended claim.

In the drawings forming part of this application, like numerals of reference indicate similar parts in the several views, and wherein:—

Figure 1—is a side elevational view of a conventional type of motor vehicle, a portion of the same being broken away, for more adequately disclosing my improved signalling means associated therewith.

Figure 2—is a front elevational view of one of the signal boxes employed by me in connection with this invention.

Figure 3—is a sectional view through the signal box, shown in Figure 2, a portion of the signal drum therein being shown in cross section.

Figure 4—is an end elevational view of the box shown in Figures 2 and 3.

Figure 5—is a cross sectional view upon the line 5—5 of Figure 2. and looking in the direction of the arrows, and Figure 6—is a fragmentary enlarged cross sectional view on the line 6—6 of Figure 2.

With particular reference to the drawings, my device includes a front and rear signal box 1 and 2, mounted upon the dash board *a* and the rear wall *b* of any desirable form of motor vehicle, as more clearly shown in Figure 1. As a means for adequately mounting these signal boxes in their respective positions, each are provided with suitable bracket members 3, and it is to be noted that the front signal box 1, is so supported upon the dash or instrument board *a*, as to be directly rearwardly of the wind shield of the vehicle, and adjacent the left hand side thereof.

The signal boxes 1 and 2 are of identical construction, and it is believed that a description of one will suffice for both. Each of these boxes includes a drum-shaped housing or casing 4, closed at one end as at 5, and open at its opposite end. The open end of each casing or housing is slightly reduced as at 6 and engaging over this reduced end is a closure cap 7, secured to the casing by set screws or the like fastening means 8. The closed end 5 of the casings are each provided with a central opening 9 therein, the opposite sides of this opening being surrounded by collars 10. Journaled at one end within the opening 9 is a freely rotatable shaft 11, extending within the casing or housing 4 to a point substantially midway therein, and as more clearly shown in Figure 3.

Engaging over the inner portion of this shaft 11, is a relatively long tubular member or sleeve 12, which is formed centrally within a rotary signal box 13, and preferably upon the closed end 14 thereof. The extreme inner end of the shaft 12 is screw threaded as shown, for receiving a binding nut 15, which is adapted for wedging engagement with the end of the tubular member 12, for securely maintaining the signal box 13 upon the shaft 11, whereby when this shaft is rotated, the box will rotate therewith. Upon the shaft 11, and between the end 14 of the signal box 13, and the inner collar 10, upon the wall 5 of the casing 4, there is keyed a collar 16, which has formed thereon a sprocket gear 17 for purposes hereinafter more fully described.

The before mentioned signal box 13 is of hexagonal shape, and is open at the end opposite the sleeve or tubular member 12. This box is so formed as to provide six longitudinally extending openings therein, and within each of these openings are plates of glass 18. These glass plates have successively formed thereon the words "Stop", "Left", "Right", "Straight", "Turn", and "Back", the plates being of opaque material, and the words being formed preferably, by leaving portions of these plates transparent.

Extending within the drum casing or housing 4, and also within the signal box 13, is a relatively elongated tubular lamp socket 19, one end of this socket adapted for detachably receiving an electric bulb 20, the other end of this lamp socket being securely mounted by binding members 21, within a central opening formed in the end cap 7 of the casing or housing 4. The electric bulb 20 receives its source of energy through an electric wire 22, passing through the socket 19, and being connected to the usual storage battery of the motor vehicle. A desirable form of electric switch is provided in the line of circuit between the battery and electric bulb 20 for making and breaking the circuit to the bulb whenever desired.

The glass plates 18 within the signal boxes 13 may be of a plain color, but I desire that the plates having the word "Stop" formed therein be of the color red.

Each drum-shaped casing or housing 4, has a longitudinally extending opening 23 therein and closing this opening is a glass plate 24 retained in position upon the casing by a frame member 25, and in view of this opening, it will be readily understood that the several signal plates upon the signal box 13 will be readily visible for properly indicating the different intentions of the driver, when this signal box 13 is rotated in a manner hereinafter described.

The outer end of the shaft 11 of the front signal box 1, has keyed thereto, a collar 26 formed upon one end of an arm 27, the other end of this arm carrying an operating handle 28. Upon the outer surface of the end wall 5 of this casing or housing 4, there is formed spaced indicating letters 29, these letters representing the different signal words formed upon each of the glass plates 18, in the signal box 13. These indicating letters 29 may be, and preferably are, of luminous material, so as to be readily visible at night time, and directly inwardly of each is a spring clip 30, these clips being riveted or otherwise secured to the end wall 5 of the casing 4. Each of these spring clips 30 is so bent as to provide a central notch 31 therein, and the inner surface of the before mentioned arm 27 is provided with a projecting head 32 adapted for engaging within the notches 31 of these spring clips for adequately retaining the signal boxes 13 in a set position.

The before mentioned sprocket gear 17 upon the shaft 11 of the front signal member 1, has a sprocket chain 33 passing thereover, this chain extending downwardly within the body of the vehicle, and in turn, engaging over a relatively smaller sprocket gear 34, rotatable in a bracket 35, pendent from the floor board $c$ of the motor vehicle. This bracket 35 also carries another sprocket gear (not shown) and engaging over this gear, is a sprocket chain 36, extending rearwardly beneath the flooring of the vehicle, and similarly engaging over the sprocket gear 17 of the rear signalling box 2.

This chain 36 is guided between a pair of guide rollers 37 clearly shown in Figure 1.

In view of the above description, it will at once be apparent, that if the driver of the vehicle upon which my signalling means is installed, intends to bring the same to a stop, the handle 28 upon the front signal 1, is properly operated to bring the plate 18, having the word "Stop" thereon in a position adjacent the opening 23 in the drum casing or housing 4, and through the instrumentality of the sprocket chain connections between the front and rear signalling members, the stop plate within the rear signal box 2, will also be brought or rotated to a visible position. It will further be seen that in view of the head 32 upon the arm 27 engaging within the notch 31, of the proper one of the spring clips 30, these stop indicating plates will be maintained in this position until the handle 28 is again rotated. The bulb 20 within each of the signalling means may be illuminated for permitting these signal boxes to be plainly visible at night time, and while I have herein shown and described the preferred embodiment of the present invention, it is nevertheless to be understood that minor changes may be made therein, without departing from the spirit and scope of the invention as claimed.

What I claim as new is:—

In an automobile direction indicator device, a cylindrical casing mounted upon a fixed support, a shaft journalled centrally in the end thereof, a crank mounted at the outer end of the shaft and having means for frictionally engaging the casing, a sprocket wheel mounted upon the shaft and located interiorly of the casing, a driving chain trained around the sprocket wheel and passing through the casing, a drum mounted upon the shaft and housed within the casing and having an end portion bearing against the hub of the sprocket wheel, a nut screwed upon the shaft and located interiorly of the drum and bearing against the same to force the drum in frictional contact with the hub of the sprocket wheel, a closure for that end of the casing opposite the end in which the shaft is journalled, a socket member carried by the closure and disposed in alinement with the shaft, and a bulb carried by the socket member and disposed at a point between the ends of the drum.

In testimony whereof I affix my signature.

GEORGE W. WILKINS.